(12) United States Patent
Zhang et al.

(10) Patent No.: US 8,964,838 B2
(45) Date of Patent: Feb. 24, 2015

(54) VIDEO CODING SYSTEM USING SUB-CHANNELS AND CONSTRAINED PREDICTION REFERENCES TO PROTECT AGAINST DATA TRANSMISSION ERRORS

(75) Inventors: Dazhong Zhang, Milpitas, CA (US); Hsi-Jung Wu, San Jose, CA (US); Xiaosong Zhou, Campbell, CA (US)

(73) Assignee: Apple Inc., Cupertino, CA (US)

( * ) Notice: Subject to any disclaimer, the term of this patent is extended or adjusted under 35 U.S.C. 154(b) by 309 days.

(21) Appl. No.: 13/175,079

(22) Filed: Jul. 1, 2011

(65) Prior Publication Data

US 2011/0274167 A1    Nov. 10, 2011

Related U.S. Application Data

(63) Continuation-in-part of application No. 12/337,273, filed on Dec. 17, 2008.

(51) Int. Cl.
| | | |
|---|---|---|
| *H04N 7/12* | (2006.01) | |
| *H04N 11/02* | (2006.01) | |
| *H04N 11/04* | (2006.01) | |
| *H04N 21/2343* | (2011.01) | |
| *H04N 21/2381* | (2011.01) | |
| *H04N 21/438* | (2011.01) | |
| *H04N 21/63* | (2011.01) | |
| *H04N 21/6583* | (2011.01) | |
| *H04N 19/61* | (2014.01) | |
| *H04N 19/37* | (2014.01) | |
| *H04N 19/157* | (2014.01) | |
| *H04N 19/166* | (2014.01) | |

(Continued)

(52) U.S. Cl.
CPC ... *H04N 21/234381* (2013.01); *H04N 21/2381* (2013.01); *H04N 21/4381* (2013.01); *H04N 21/631* (2013.01); *H04N 21/6583* (2013.01); *H04N 19/61* (2014.11); *H04N 19/37* (2014.11); *H04N 19/157* (2014.11); *H04N 19/166* (2014.11); *H04N 19/89* (2014.11); *H04N 19/31* (2014.11)
USPC ..................................... 375/240.12

(58) Field of Classification Search
USPC ..................................... 375/240.12
See application file for complete search history.

(56) References Cited

U.S. PATENT DOCUMENTS

| | | | | |
|---|---|---|---|---|
| 5,376,969 | A | * 12/1994 | Zdepski | 348/466 |
| 5,825,430 | A | * 10/1998 | Adolph et al. | 348/487 |
| 6,606,112 | B1 | * 8/2003 | Falco | 348/14.12 |

(Continued)

OTHER PUBLICATIONS

Error Concealment in MPEG Video Streams Over ATM Networks; Paul Salama et al.; IEEE Journal on Selected Areas in Communications, vol. 18, No. 6, Jun. 2000.*

(Continued)

*Primary Examiner* — Christopher Brown
*Assistant Examiner* — James Turchen
(74) *Attorney, Agent, or Firm* — Kenyon & Kenyon LLP

(57) ABSTRACT

A coding technique is disclosed in which frames of a video sequence are assigned to one of a plurality of sub-channels to be transmitted to a decoder. The frames are coded according to predictive coding techniques such that ordinarily prediction references of the frames in each sub-channel only reach the reference frames that occur within the same sub-channel. Thus, if transmission errors arise with respect to one sub-channel, decoding may occur for another sub-channel until the transmission error is detected and corrected.

17 Claims, 9 Drawing Sheets

(51) Int. Cl.
*H04N 19/89* (2014.01)
*H04N 19/31* (2014.01)

(56) References Cited

U.S. PATENT DOCUMENTS

| | | | | |
|---|---|---|---|---|
| 7,140,016 B2* | 11/2006 | Milovanovic et al. | ........ | 718/100 |
| 7,266,155 B2* | 9/2007 | Jaffe et al. | ..................... | 375/260 |
| 7,352,820 B2* | 4/2008 | Redfern | ........................ | 375/260 |
| 7,548,995 B2* | 6/2009 | Thukral | .......................... | 710/20 |
| 7,911,537 B2* | 3/2011 | Choi et al. | .................... | 348/565 |
| 2009/0245392 A1* | 10/2009 | Leung et al. | ............. | 375/240.27 |

OTHER PUBLICATIONS

A Cross-Layer Approach for Efficient MPEG-4 Video Streaming Using Multicarrier Spread-Spectrum Transmission and Unequal Error Protection; Nicola Conci et al.; IEEE; 2005.*

* cited by examiner

100

200

500

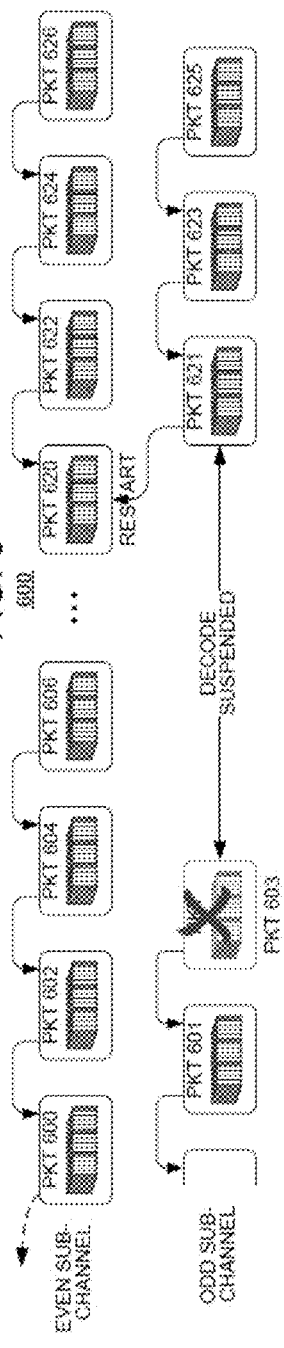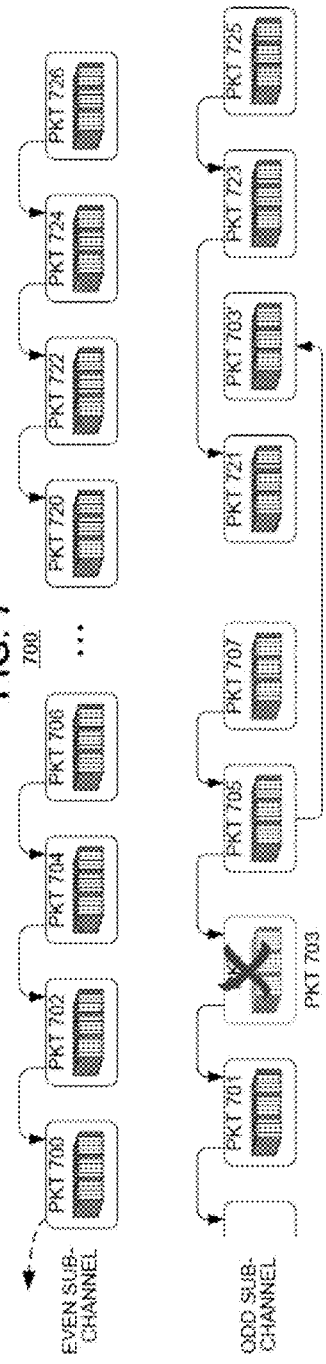

800

900

1100

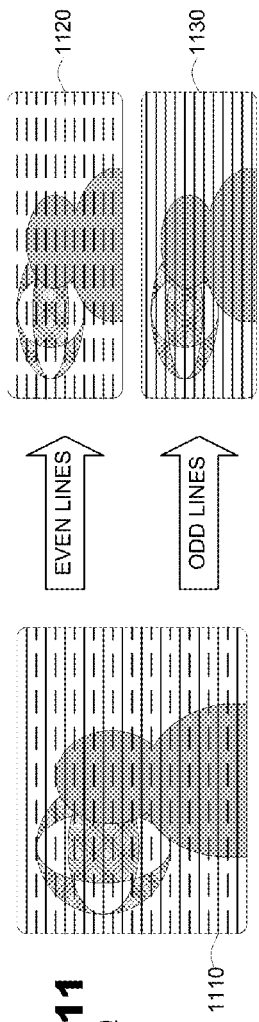
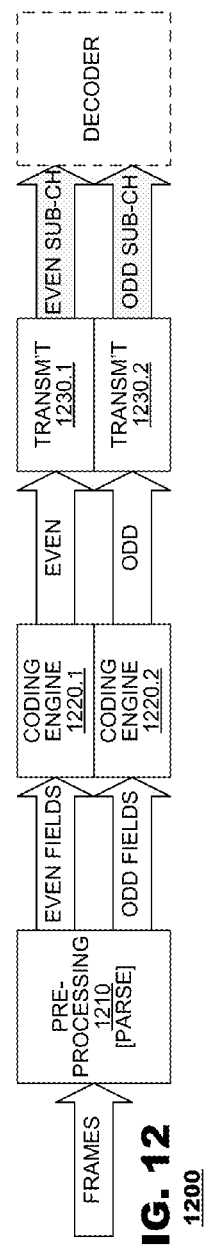
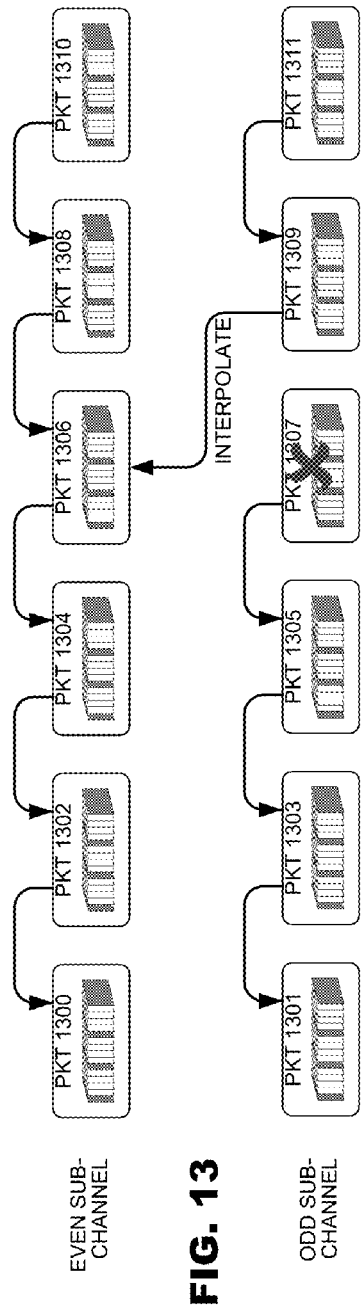
FIG. 11
1100
FIG. 12
1200
FIG. 13

VIDEO CODING SYSTEM USING SUB-CHANNELS AND CONSTRAINED PREDICTION REFERENCES TO PROTECT AGAINST DATA TRANSMISSION ERRORS

PRIORITY

This application is a continuation in part of U.S. patent application Ser. No. 12/337,273, filed Dec. 17, 2008, and benefits from the priority of that application.

BACKGROUND

The present invention relates to error mitigation techniques in video coding systems involving transmission through data networks.

Data errors are persistent problems in communication networks. To protect against transmission errors, it is common to encode data using error correction codes that permit a receiving entity to identify and correct some data corruption. While such techniques offer protection against some transmission errors, they do not solve all such problems.

Data transmission errors are particularly problematic in video coding systems. Video coders commonly achieve compression of video signals by exploiting temporal redundancy in video. Coders for example, predict data of one frame of video data using data of another frame that has coded previously and is known to both an encoder and a decoder. The first frame may be used to predict data of a second frame and the second frame may be used to predict data of a third frame. Such video coders can generate prediction chain across long sequences of video frames such that, if a single reference frame were lost due to a transmission error, a decoder not only would be unable to decode the lost frame but it also would be unable to decode any other frame that relied on the lost frame as a source of prediction. Thus, a transmission error that is very short—it corrupts a single reference frame—can have consequences that prevent decoding of many more frames in a coded video sequence.

No known system protects adequately against transmission errors that cause lost of reference frames from coded video data. Accordingly, there is a need in the art for a video coding system that provides increased protection against data errors and, particularly, one that permits at least partial decoding to continue even if a reference frame is lost.

BRIEF DESCRIPTION OF THE DRAWINGS

FIGS. 6 and 7 illustrate exemplary sub-channel packets and prediction references that may occur during operation of the present invention.

FIG. 11 illustrates an exemplary frame parsed into sub-frames according to even and odd lines according to an embodiment of the present invention.

FIG. 12 illustrates an exemplary processing flow of operations to be performed on the even and odd fields according to an embodiment of the present invention.

FIG. 13 illustrates exemplary relationships among packet data for a system operating according to an embodiment of the present invention.

DETAILED DESCRIPTION

Embodiments of the present invention provide a coding technique in which frames of a video sequence are assigned to one of a plurality of sub-channels to be transmitted to a decoder. The frames are coded according to predictive coding techniques such that ordinarily prediction references of the frames in each sub-channel only reach the reference frames that occur within the same sub-channel. Thus, if transmission errors arise with respect to one sub-channel, decoding may occur for another sub-channel until the transmission error is detected and corrected.

Figure 1:
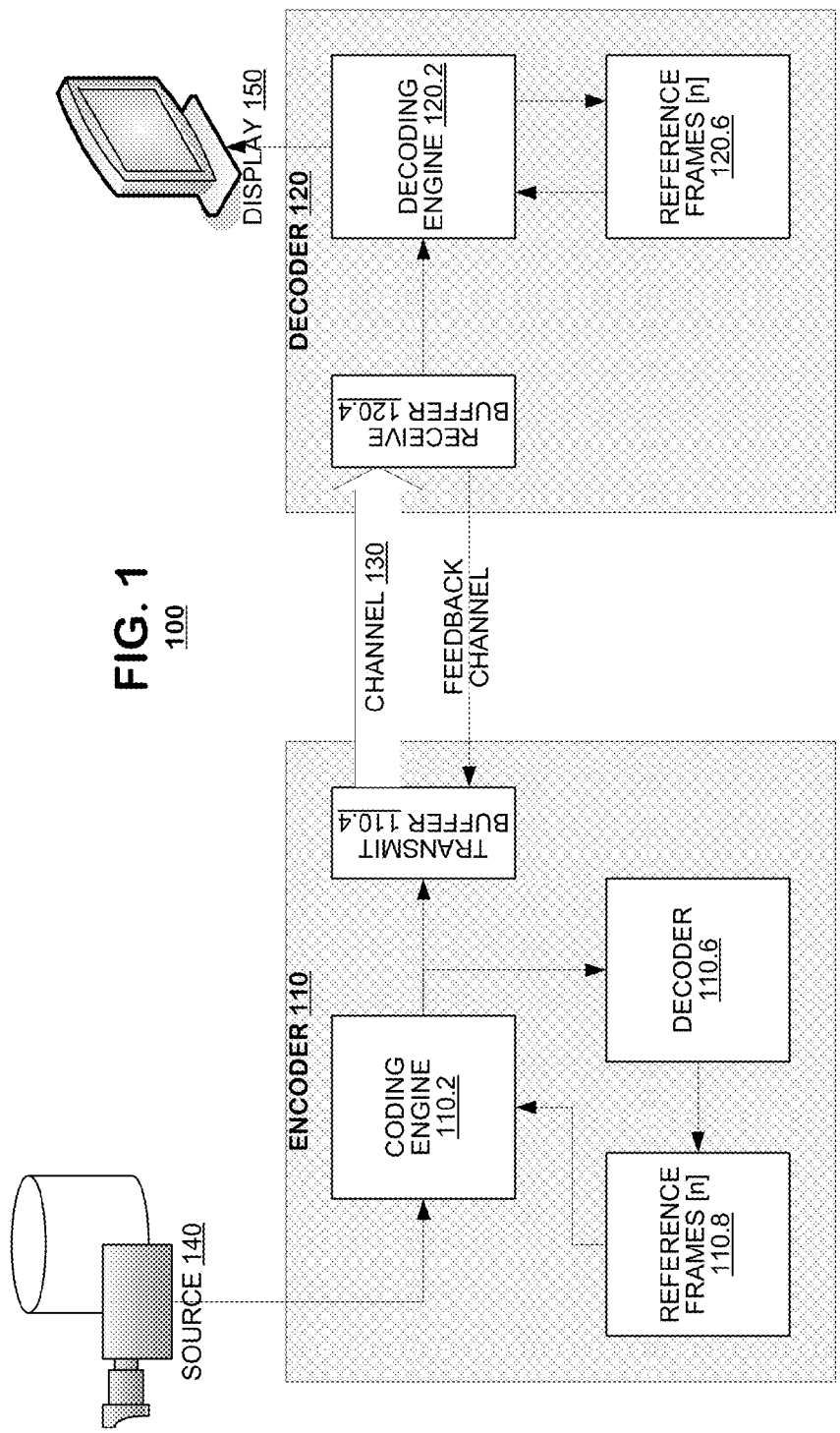
FIG. 1 is a simplified block diagram of a video coding system according to an embodiment of the present invention.

FIG. 1 illustrates a video coding system 100 according to an embodiment of the present invention. The system may include an encoder 110 and a decoder 120 provided in communication via a channel 130. The encoder 110 accepts source video from a source 140, for example a camera or a storage device, and codes the video data in a manner that reduces the bandwidth of the signal (e.g. compresses the source video). The encoder 110 delivers coded video data to the decoder 120. The decoder 120 decodes the coded video data in a manner that inverts the compression applied by the encoder 110. The decoder 120 generates recovered video data, which is a replica of the source video, which can be stored or displayed, for example via display device 150.

FIG. 1 provides a simplified block diagram of an encoder 110. The encoder may include a coding engine 110.2, which is a functional block that applies coding processes to the source video and generates coded video therefrom. A variety of coding processes are well known. They include the H.264 series of coding standards and the MPEG series of coding standards. Typically, such coding processes include data prediction, data transformation (e.g., DCT or wavelet transformation), quantization and entropy coding. Coded video data may be stored in a transmit buffer 110.4 until the data can be scheduled for transmission to the decoder.

The encoder 110 also may include a decoder 110.6 which decodes the coded video data to derive the recovered video data that will be obtained by the decoder 120. Certain frames of recovered video data may be stored by the encoder 110 as reference frames (in buffer 110.8), which can be used by the coding engine 110.2 as sources of prediction for subsequent coding processes. In this regard, the operation of encoders is well known.

FIG. 1 also provides a simplified block diagram of a decoder 120. The decoder may include a decoding engine 120.2 that inverts the processes performed by the encoder's coding engine 110.2. The decoder also may include a receiver buffer 120.4 that stores received data until it can be scheduled for decoding by the decoding engine and a buffer 120.6 that may store decoded reference frames for use in subsequent decoding processes. For example, the H.264 standard includes protocols that support up to 16 reference frames concurrently. In this regard, the operation of decoders is well known.

The system of FIG. 1 may find application for us in network-based delivery systems in which coded video data is delivered to decoders 120 via a communication channel provided by the network. Coded data may be transmitted across a channel 130 of the network in datagrams, packets or other transmission units (called "packets" herein for ease of reference). The network also may support a feedback channel through which the decoder 120 may communicate with encoders 110 to acknowledge successful reception of transmitted packets or to identify transmitted packets that were not successfully received at the decoder. The architecture and organization of the network that supports the channel 130 is immaterial to the present discussion excepted as noted herein.

Figure 2:
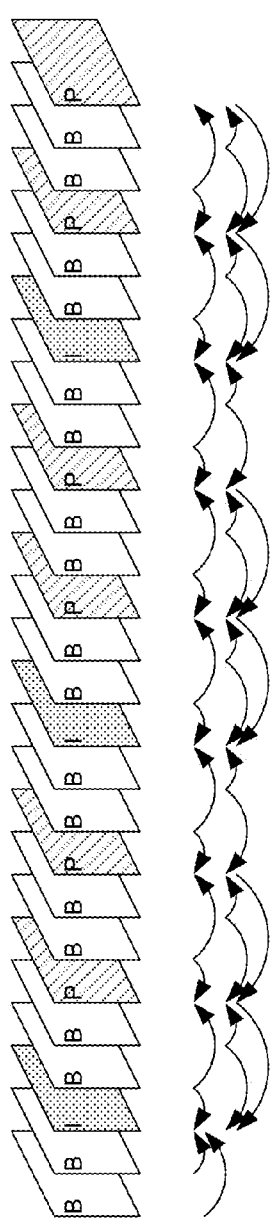
FIG. 2 illustrates frame type assignments and prediction references that may occur in conventional coding systems.

FIG. 2 illustrates an exemplary source video sequence and conventional predictive coding techniques that may be applied to them. The source video may include a sequence of video frames. During coding, each frame may be assigned a certain frame type, which can affect the coding techniques that are applied to the respective frame. For example, frames often are assigned to as one of the following frame types:

- An Intra Frame (I frame) is one that is coded and decoded without using any other frame in the sequence as a source of prediction,
- A Predictive Frame (P frame) is one that is coded and decoded using earlier frames in the sequence as a source of prediction,
- A Bidirectionally Predictive Frame (B frame) is one that is coded and decoder using both earlier and future frames in the sequence as sources of prediction.

Frames commonly are parsed spatially into a plurality pixel blocks (for example, blocks of 4×4, 8×8 or 16×16 pixels each) and coded on a pixel block by pixel block basis. Predictive coding techniques may be performed on each pixel block of the frame. Based on the predictive coding that is applied to each frame, the coding process may define prediction chains among the frames in the video sequence, which are represented in FIG. 2 by arrows.

Figure 3:
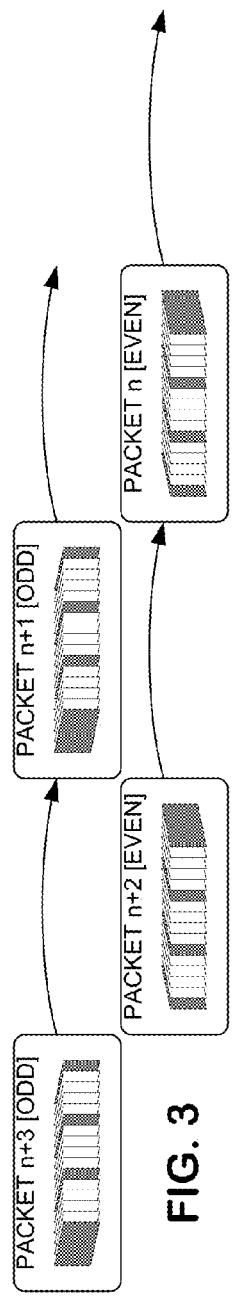
FIG. 3 illustrates exemplary sub-channel assignments and prediction references that may occur during operation of the present invention.
Figure 4:
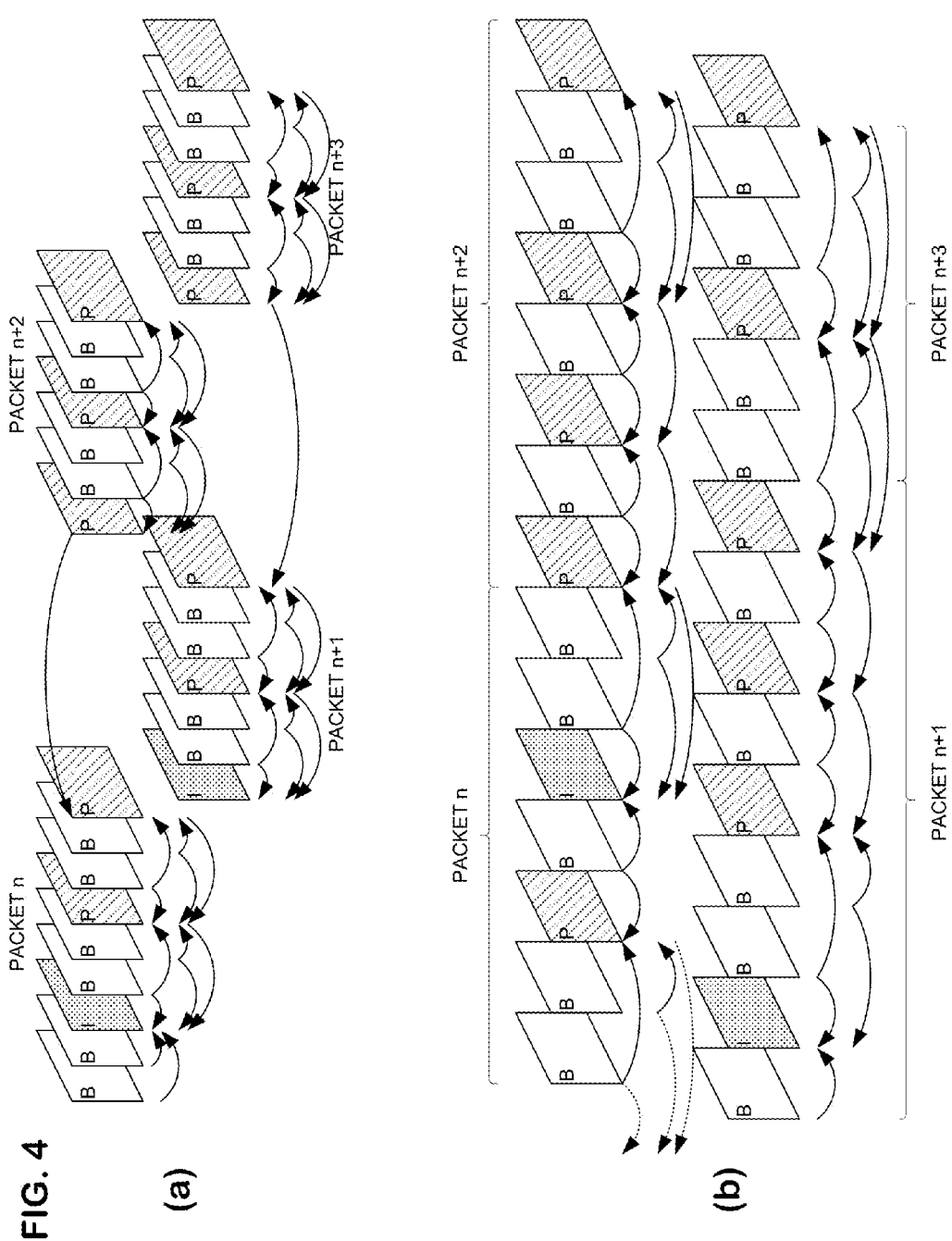
FIG. 4 illustrates exemplary frame type assignments, prediction references and packet assignments that may occur during operation of the present invention.

Embodiments of the present invention propose to develop a pair of (or more) logical sub-channels within the transmission channel 130 established between an encoder 110 and a decoder 120. For ease of reference, the sub-channels are termed the "even channel" and the "odd channel" respectively. FIGS. 3 and 4 illustrate relationships between transmitted packets and a coded video sequence, according to an embodiment of the present invention. As illustrated, packets may include coded video data of one or more frames of the video sequence. Packets may be generated sequentially and alternately assigned to the odd or even channels. In this embodiment, during normal operation prediction references of coded frames are constrained to refer to references frames that appear in the same sub-channel as the coded frame. In other words, a coded frame that is assigned to the even sub-channel may refer only to a reference frame that also is assigned to the even sub-channel and a coded frame that is assigned to the odd sub-channel may refer only to a reference frame that also is assigned to the odd sub-channel. A coded frame may rely on a reference frame from the same packet as the coded frame or on a reference frame that is in a different packet as the coded frame. FIG. 4, for example, shows both inter-packet prediction references and intra-packet prediction references.

Frames may be assigned to packets according to a variety of schemes. FIG. 4(a) illustrates an example where coded data of a sequence of consecutive frames are assigned to each packet. FIG. 4(b) illustrates another example where frames are assigned to odd and even sub-channels in an alternating fashion.

Figure 5:
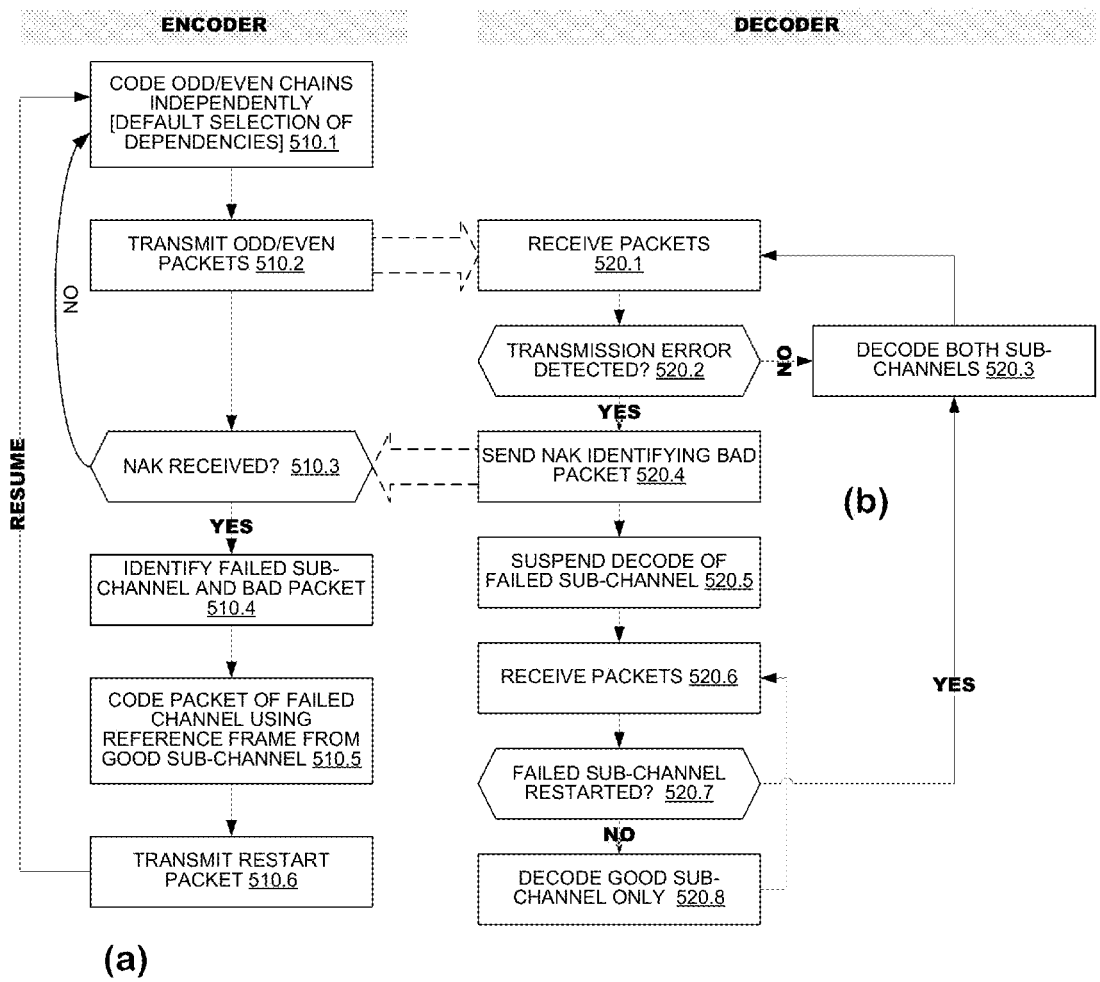
FIG. 5 illustrates a method according to an embodiment of the present invention.

FIG. 5 is a flow diagram illustrating a method of operation of encoders and decoders according to an embodiment of the present invention. Boxes 510.1-510.2 represent operation of an encoder during a normal mode of operation. As such, the encoder may code frames belonging to the even sub-channels and the odd sub-channels independently of each other (box 510.1). In this normal mode, prediction references for a given frame are constrained to reach only those reference frames that occur within the same sub-channel as the frame being coded. Thereafter, the transmitter may transmit odd and even packets to a decoder (box 510.2).

Boxes 520.1-520.3 represent operation of a decoder according to normal operation. The decoder may receive transmitted packets from an encoder (box 520.1) and determine whether transmission errors have occurred with respect to the received packets (520.2). If not, if the packets are well received, the decoder may decode the packets from both sub-channels (box 520.3) and generate a recovered video sequence therefrom. This operation may continue indefinitely until the video sequence is fully processed or until a transmission error is detected.

If the decoder detects a transmission error, the decoder may identify the bad packet and transmit an identifier of the bad packet back to the encoder via the back channel (box 520.4). Colloquially, the decoder may send a negative acknowledgement to the encoder (or "NAK"). The decoder may identify the sub-channel—odd or even—to which the bad packet belongs and treat the identified sub-channel as a "failed sub-channel." The decoder may suspend decoding of packets belonging to the failed sub-channel but continue decoding of packets belonging to the other sub-channel (the "good sub-channel") (box 520.5).

At the encoder, if the encoder receives a negative acknowledgement (box 510.3), the encoder may identify the bad packet and the sub-channel that has failed (box 510.4). The encoder may code one or more frames of the failed sub-channel using reference frame(s) from the good sub-channel (box 510.5), or from the failed sub-channel earlier than the failure point. The packet generated in box 510.5 may be termed a "restart" packet. The encoder may transmit the restart packet to the decoder in the failed sub-channel (box 510.6). Thereafter, the encoder may resume normal operation (boxes 510.1-510.2). If both sub-channels failed, a "restart" packet needs to be generated for each sub-channel.

At the decoder, once it suspends decoding of the failed sub-channel, the decoder may continue to receive packets and decode coded video data contained in the good sub-channel (box 520.6, 520.8). The decoder also may examine packets of the failed sub-channel to determine if the sub-channel contains a restart packet (box 520.7). If not, the decoder continues to decode the good sub-channel only (box 520.8). Since both NAKs and restart packets could get lost, the decoder should re-send the NAK at certain intervals until it receives a restart packet. Once it does, the decoder should have sufficient information on which to decode both sub-channels and, therefore, it may revert to normal operation (boxes 520.1-520.3).

FIG. 6 illustrates an exemplary packet sequence that may occur during operation of the foregoing method and its effect on decoding processes. In this example, packets 600-603 are created for both the even and odd channel in the normal mode. The packets contain prediction references that are constrained to refer only to reference frames of a common sub-channel.

In this example, packet 603 is received with a transmission error that renders it unusable. In response, a decoder may suspend decode of the sub-channel in which it occurs (the odd sub-channel in the example of FIG. 6). Packets of the even sub-channel may be received and decoded so as to generate a useful recovered video signal.

Packet 621 is shown as a restart packet. Packet 621 may contain coded video data that refer to frames of packet 620 as reference frames for prediction. In this case, the decoder may detect the presence of a restart packet, decode the frames contained therein and resume normal operation for subsequently received packets in the failed sub-channel (e.g., packets 623-625, etc.).

The principles of the present invention find application in a wide variety of communication networks. Given the variety of networks in which these embodiments may be used, there can be wide variation in the round trip latency that may occur from the time that a given packet is transmitted by the encoder to the time that the packet is detected as having a transmission error by the decoder and the time that the encoder receives a negative acknowledgement of the packet. In some embodiments, if the round trip latency is large enough that it is unlikely the decoder would be able to receive a new copy of the failed packet and reconstruct packets of the failed sub-channel that were coded after the failed packet but before the encoder received the negative acknowledgement (say packets 605-619 in the example of FIG. 6), the encoder may code a next packet 621 in sequence and use a nearby packet from the good sub-channel as a reference.

In other network implementations for which the round trip latency is sufficiently short, an encoder may attempt to re-transmit the failed packet. This embodiment is shown in FIG. 7. In this example, if packet 703 is identified as a failed packet, the encoder may attempt to re-transmit it. In this embodiment, a decoder may retain received packets 705-721 etc. that follow the failed packet in the receive buffer and may attempt to decode them upon receipt of the re-transmitted packet 703. If the display requirements of the decoder provide sufficient time for the decoder to await a re-transmitted packet 703 and then decode it as well as the retained packets 705-721, this embodiment may eliminate display errors that otherwise would have been caused by lost frames in the failed sub-channel.

Figure 8:
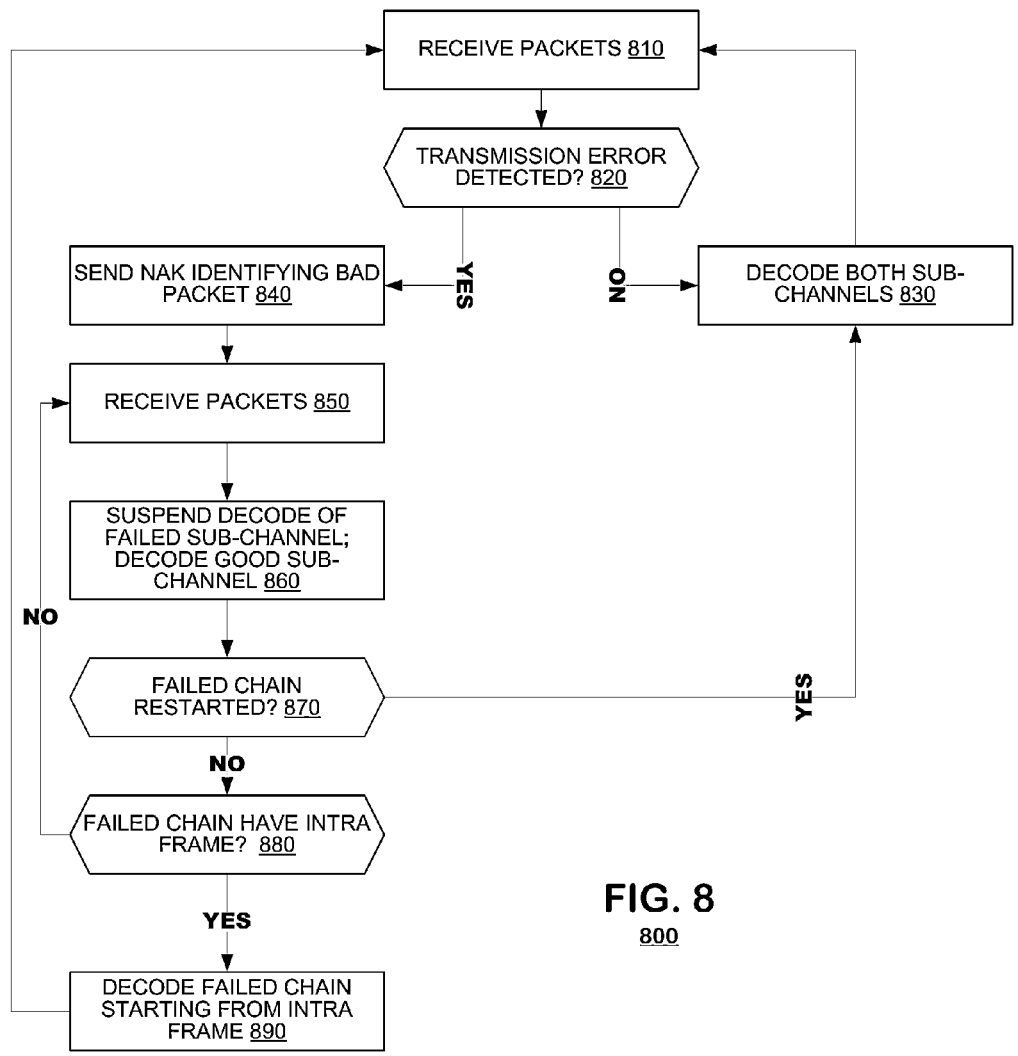
FIG. 8 illustrates another method according to an embodiment of the present invention.

FIG. 8 illustrates another decoder method 800 according to an embodiment of the present invention. In this embodiment, the normal mode of operation may occur as in the embodiment of FIG. 5. That is, the decoder may receive packets, determine whether the packets contain transmission errors and, so long as there are no errors, decode coded video data from both sub-channels (boxes 810-830).

If a transmission error occurs, the decoder may send a negative acknowledgement identifying the bad packet to the decoder (box 840). The decoder may continue to receive packets (box 850) and decode the good sub-channel but it may suspend decode of the failed sub-channel (box 860). The decoder may continue to monitor the failed sub-channel to determine if the encoder has restarted the sub-channel (box 870). If so, the decoder may resume normal operation. Even if not, the decoder may determine whether a received packet in the failed sub-channel contains an I/IDR frame (box 880). If so, the I/IDR frame can be decoded (box 890); it does not refer to any other frame as a source of prediction. Moreover, any frame in the failed sub-channel that refers only to the I/IDR frame or another good frame after the I/IDR frame as a source of prediction also may be decoded.

Conventionally, I/IDR frames are used in video coding to support random access functionality. By decoding an I/IDR frame, the decoder may recover from a sub-channel failure before receiving a restart packet.

Figure 9:
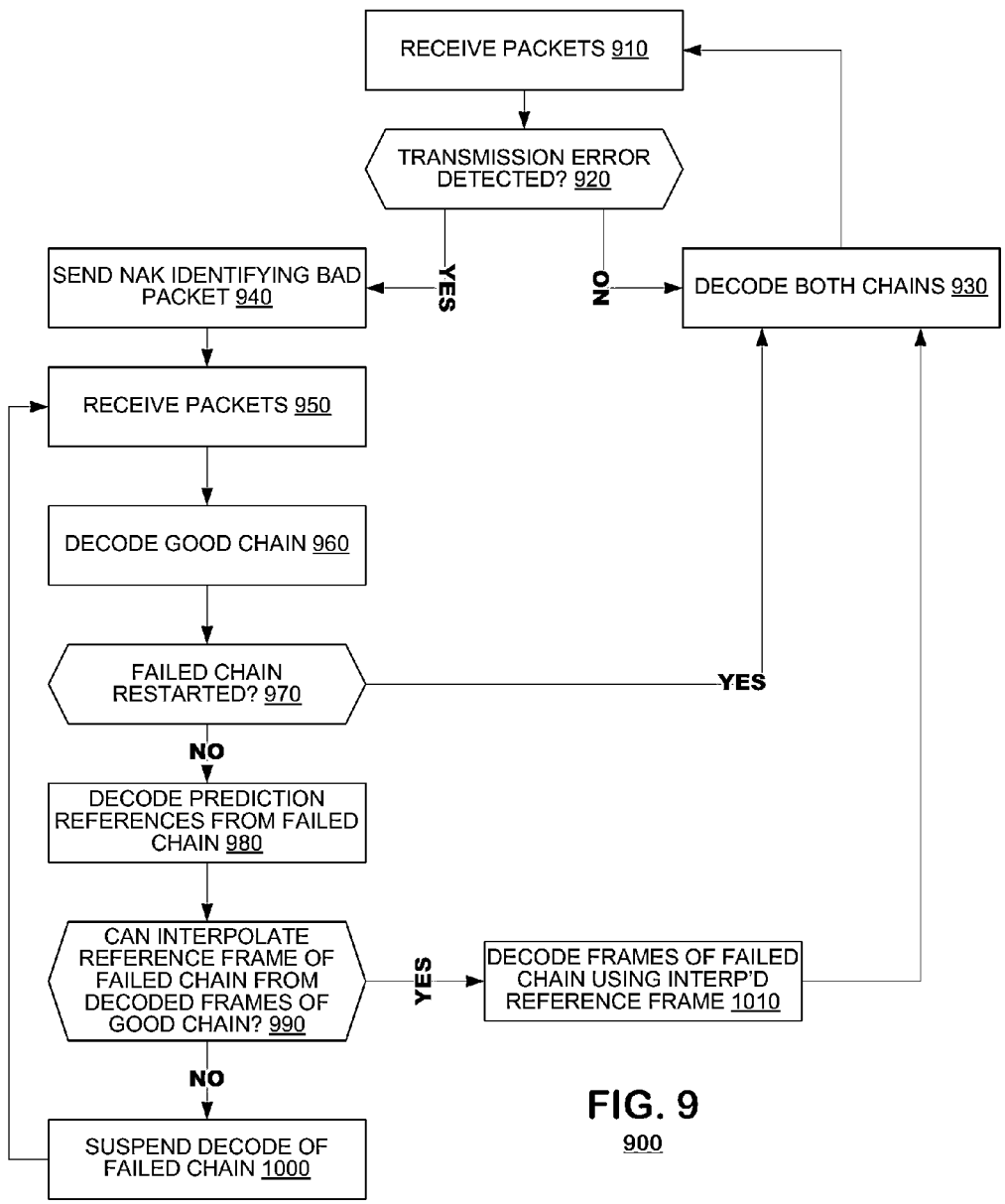
FIG. 9 illustrates a further method according to an embodiment of the present invention.

FIG. 9 illustrates another decoder method according to an embodiment of the present invention. In this embodiment, the normal mode of operation also may occur as in the embodiment of FIG. 5. That is, the decoder may receive packets, determine whether the packets contain transmission errors and, so long as there are no errors, decode coded video data from both sub-channels (boxes 910-930).

If a transmission error occurs, the decoder may send a negative acknowledgement identifying the bad packet to the decoder (box 940). The decoder may continue to receive packets (box 950) and decode the good sub-channel but it may suspend decode of the failed sub-channel (box 960). The decoder may continue to monitor the failed sub-channel to determine if the encoder has restarted the sub-channel (box 970). If so, the decoder may resume normal operation.

Even if the failed sub-channel has not been started, the decoder may examine packets of the failed channel to identify the position of reference frames in display order (box 980). The decoder may attempt to interpolate content of the reference frames from recovered video data obtained from the good sub-channel (box 990). For example, if frames are assigned to odd and even sub-channels in an alternating fashion (see, FIG. 4(*b*)), a decoder may be able to decode video content of two frames that are adjacent to each missing reference frame using the coded data from the good sub-channel. If the decoded frames are similar to each other within a predetermined level of variation, the decoder may interpolate content of the missing reference frame within a high level of confidence. Having done so, the decoder may decode subsequently received packets using the interpolated reference frame as a source of prediction for the frames in the subsequently received packets of the failed sub-channel (box 1010). Thereafter, the decoder may resume normal operation. If, however, the decoder cannot interpolate content of the missing reference frames with a sufficient level of confidence, the decoder may continue decoding only the coded video data present in the good sub-channel (box 1000).

Figure 10:
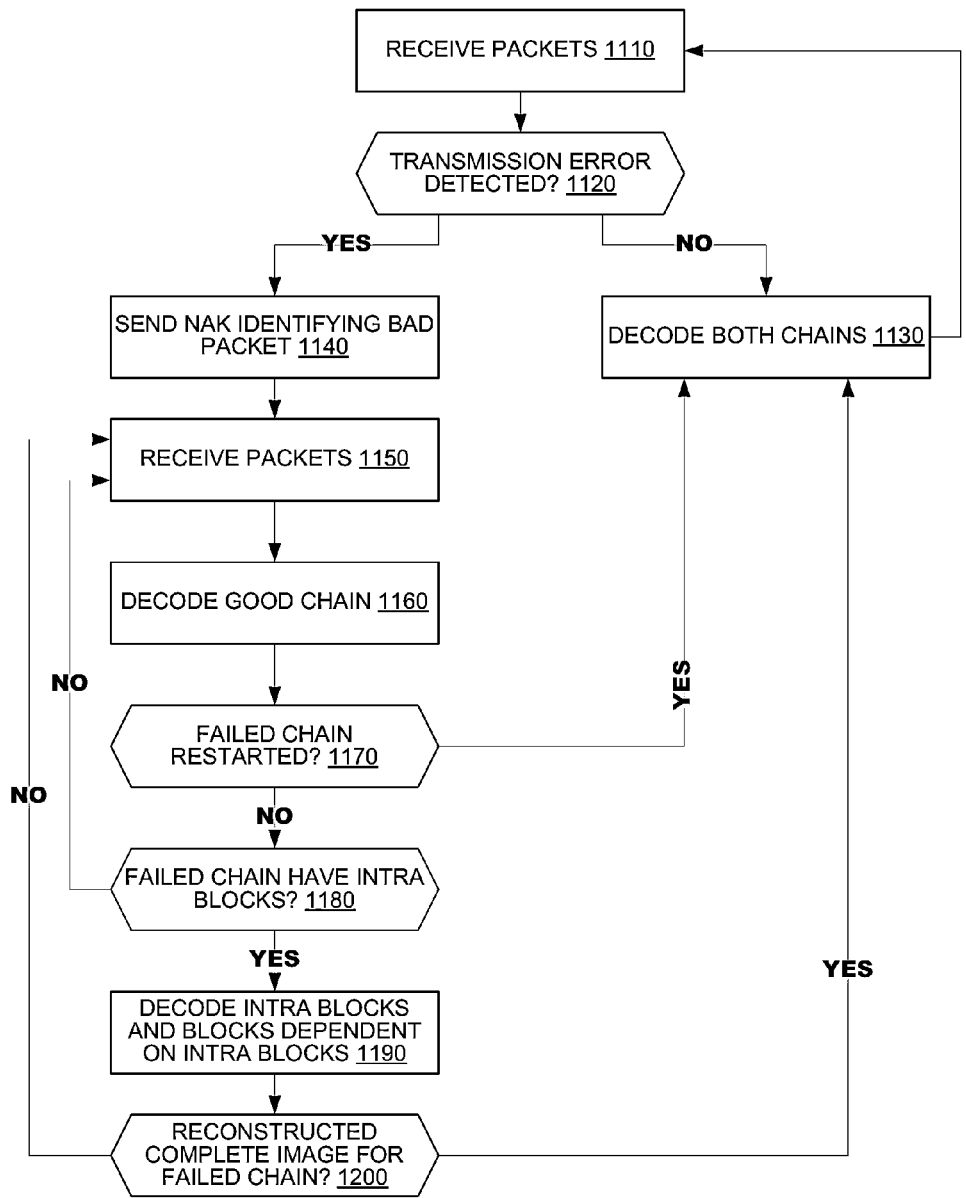
FIG. 10 illustrates another method according to an embodiment of the present invention.

FIG. 10 illustrates another decoder method according to a further embodiment of the present invention. In this embodiment, the normal mode of operation also may occur as in the embodiment of FIG. 5. That is, the decoder may receive packets, determine whether the packets contain transmission errors and, so long as there are no errors, decode coded video data from both sub-channels (boxes 1110-1130).

If a transmission error occurs, the decoder may send a negative acknowledgement identifying the bad packet to the decoder (box 1140). The decoder may continue to receive packets (box 1150) and decode the good sub-channel but it may suspend decode of the failed sub-channel (box 1160). The decoder may continue to monitor the failed sub-channel to determine if the encoder has restarted the sub-channel (box 1170). If so, the decoder may resume normal operation.

Even if the failed sub-channel has not been started, the decoder may examine packets of the failed channel to identify intra coded pixel blocks contained therein (box 1180). Intra coded pixel blocks can appear in any frame type (I frames, P frames or B frames); the intra coded pixel blocks can be decoded without reference to any other block. If such pixel blocks are found, the system may decode the intra coded blocks and any pixel blocks of other frames that only depend on the intra coded blocks (box 1190). The decoder further may determine whether a sufficient number of intra coded blocks and their dependents have been decoded to render a complete image (box 1200). If so, the decoder may use the completed image to restart the failed sub-channel. If not, the decoder may continue operation with decoding of the failed sub-channel being suspended.

The embodiment of FIG. 10 may find application in certain coding environments where intra coded frames appear frequently in the coded video data. The intra coded blocks may be introduced to the coded video data as an effort to apply a gradual refresh to the video data but avoid the costs associated with full I frames, which tend to be very large as compared to P or B frames. In such an embodiment, the decoder may use the intra coded pixel blocks to "fill in" various spaces of the video data. Eventually, the decoder may receive a sufficient number of intra coded pixel blocks to cover the spatial area of the video image. The decoder may use the recovered image as a reference frame for decoding of subsequent frames.

Of course, the embodiments of FIG. 9 and FIG. 10 may be used cooperatively. That is, the decoder may interpolate data for a reference frame to facilitate a fast but coarse restart of the failed sub-channel but use received intra coded pixel blocks to improve the restarted reference image. Such techniques permit use of the FIG. 9 embodiment in circumstances where a decoder cannot confidently interpolate content of a reference frame and, therefore, decode artifacts may arise. The embodiment of FIG. 10 may use the intra coded pixel block to correct such artifacts quickly.

In other embodiments, frames may be parsed into sub-units and assigned to different sub-channels for coding and transmission. FIG. 11 illustrates one such example where individual frames 1110 are parsed into sub-frames (herein, "fields") 1120, 1120 according to even and odd lines. In this embodiment, each frame to be coded is populated by pixel data organized into a regular array of columns and rows. The frame 1110, therefore, may be parsed into the fields on a columnar or row basis. In the example illustrated in FIG. 11, all pixels belonging to even numbered rows may be assigned to an even field 1120 and all pixels belonging to odd numbered rows may be assigned to an odd field 1130.

FIG. 12 illustrates processing flow 1200 of operations to be performed on the even and odd fields illustrated in FIG. 11. As illustrated, whole frames are parsed into even and odd fields by a pre-processing unit 1210. The even and odd fields may be coded by respective coding engines 1220.1, 1220.2 and may be transmitted to a coder by respective transmitters 1230.1, 1230.2. In this embodiment, the coding engines 1220.1, 1220.2 each may operate as an encoder provisioned as shown in FIG. 1, with separate stores of reference fields.

FIG. 13 illustrates relationships among packet data for a system operating according to FIG. 12. During operation, prediction references for each field may be constrained to the sub-channels in which the field resides. That is, prediction references for even fields to be coded may be constrained to refer to reference field data belonging to the even field sub-channel and prediction references for odd fields to be coded may be constrained to refer to reference field data belonging to the odd field sub-channel. Thus, fields within a packet (say, packet 1302) may refer to other fields within the same packet 1302 as a prediction reference or to fields within another packet 1300 of the same sub-channel.

When communication errors arise, however, the loss of one or more fields within a packet 1307 can be compensated by interpolation of replacement field data from corresponding fields of packets from the counterpart sub-channel. Each even and odd field has a counterpart in the other sub-channel that derives from a common frame (FIG. 11). Lines of the lost field (say, an odd field) were interleaved with lines of the counterpart field (the even field) in the original frame and, therefore, the two fields should be highly related. A lost field, therefore, may be interpolated from its counterpart field in the other channel. Thus, when packet loss causes one or more fields to be lost, the missing field may be interpolated from its counterpart in the other sub-channel and decoding may continue using the interpolated field. Moreover, decoding may be attempted for any subsequent field that relies on the lost field for prediction.

An interpolated field is likely to resemble the lost field but it is unlikely to be perfect replacement. Drifts are likely to occur. Thus, when a field is lost, a decoder may report the lost field to the encoder to restart the corresponding sub-channel in order to completely stop the error propagation.

When multiple sub-channels are used without inter sub-channel reference, inconsistent coding noise between the sub-channels may develop over time due to separate reference chains. For example, flickering artifacts may show up in playback when frames are assigned to odd and even sub-channels in an alternating fashion. In order to reduce these effects, the sub-channels may sync to each other periodically through inter sub-channel reference.

The foregoing discussion has described operation of the embodiments of the present invention in the context of encoders and decoders. Commonly, video encoders are provided as electronic devices. They can be embodied in integrated circuits, such as application specific integrated circuits, field programmable gate arrays and/or digital signal processors. Alternatively, they can be embodied in computer programs that execute on personal computers, notebook computers or computer servers. Similarly, decoders can be embodied in integrated circuits, such as application specific integrated circuits, field programmable gate arrays and/or digital signal processors, or they can be embodied in computer programs that execute on personal computers, notebook computers or computer servers. Decoders commonly are packaged in consumer electronics devices, such as gaming systems, DVD players, portable media players and the like and they also can be packaged in consumer software applications such as video games, browser-based media players and the like.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A video coding method comprising:
   parsing each frame of a video sequence into a plurality of fields,
   assigning each field of each frame to a respective one of a plurality of sub-channels, wherein different fields are assigned to different sub-channels and no field is assigned to more than one sub-channel,
   coding content of the video sequence according to predictive coding techniques wherein, prediction references of the coded fields in each sub-channel are selected only from reference field(s) that are assigned to the same sub-channel to which the respective coded field has been assigned, and
   transmitting the coded field to a decoder in packets, each packet containing a plurality of field assigned to a common sub-channel,
   wherein during a transmission recovery mode, performing the following steps:
   interpolating select fields belonging to a first, failed sub-channel using fields from a second, good channel, the fields from the second good channel adjacent to a field being recovered in a frame of the video sequence,
   replacing a reference field belonging to the failed sub-channel with the interpolated field within a reference frame cache, and coding a subsequently received reference field with reference to data of the interpolated field.

2. The video coding method of claim 1, wherein the transmission recovery mode is engaged in response to a negative acknowledgement received from the decoder.

3. The video coding method of claim 1, further comprising evicting a reference field belonging to the failed sub-channel from a reference frame cache.

4. The video coding method of claim 1, wherein each frame is parsed into a field of even lines and a field of odd lines.

5. A video coder, comprising:
a preprocessing unit configured to parse each frame of a video sequence into a plurality of fields,
a coding engine configured to code the fields according to predictive coding techniques,
a transmission unit configured to transmit coded fields to a decoder in sub-channels, wherein different fields are assigned to different sub-channels and no field is assigned to more than one sub-channel,
wherein, the coding engine is further configured to
generate prediction references of the coded fields in each sub-channel that are selected only from reference field(s) that are assigned to the same sub-channel to which the respective coded field has been assigned,
interpolate select fields belonging to a first, failed sub-channel using fields from a second, good channel, the fields from the second good channel adjacent to a field being recovered in a frame of the video sequence,
replace a reference field belonging to the failed sub-channel with the interpolated field within a reference frame cache, and
code a subsequently received reference field with reference to data of the interpolated field.

6. The video coder of claim 5, wherein, in a transmission recovery mode of operation, the video coder interpolates select fields belonging to a first, failed sub-channel using fields from a second, good channel, the fields from the second good channel adjacent to a field being recovered in a frame of the video sequence.

7. The video coder of claim 6, wherein the transmission recovery mode is engaged in response to a negative acknowledgement received from the decoder.

8. The video coder of claim 6, further comprising a reference picture cache configured to store data of decoded reference fields,
wherein a reference field belonging to the failed sub-channel is evicted from the reference frame cache in the transmission recovery mode.

9. The video coder of claim 6, further comprising a reference picture cache configured to store data of decoded reference fields,
wherein a reference field belonging to the failed sub-channel is replaced by the interpolated field within the reference frame cache.

10. The video coder of claim 6, wherein the coding engine is further configured to code a subsequently received field with reference to data of the interpolated field.

11. The video coder of claim 5, wherein each frame is parsed into a field of even lines and a field of odd lines.

12. A video decoding method, comprising:
receiving packets of data containing coded video data, each packet belonging to one of a plurality of sub-channels, wherein different portions of the video data are assigned to different sub-channels and no field is assigned to more than one sub-channel,
in a normal mode of operation when no packet reception errors are detected, decoding coded video data of each packet, the decoding including, for each sub-channel, prediction references to be followed from coded fields to reference fields that are located in the respective sub-channel, the fields representing subsets of source frame data,
when a transmission error is detected:
interpolating field data of a lost field from a sub-channel for which a failure has occurred using data of a counterpart field from another sub-channel for which no failure has occurred, the fields from the another sub-channel for which no failure has occurred adjacent to a field being recovered in a frame of the video sequence,
replacing a reference field belonging to the failed sub-channel with the interpolated field within a reference frame cache, and
coding a subsequently received reference field with reference to data of the interpolated field.

13. The method of claim 12, further comprising transmitting a negative acknowledgement to an encoder identifying a packet for which the transmission error has occurred.

14. The method of claim 12, further comprising decoding other fields from the failed sub-channel that depend on the lost field using the interpolated field as a source of prediction.

15. A video decoder, comprising:
a decoding engine configured to decode code video data according to predictive coding techniques,
a reception unit configured to receive coded video data in sub-channels, wherein different portions of the video data are assigned to different sub-channels and no field is assigned to more than one sub-channel,
wherein the decoding engine is further configured to
generate recovered video data according to prediction references of coded fields that are selected only from reference field(s) that are assigned to same sub-channel in which the respective coded frame is received, the fields representing subsets of source frame data,
interpolate select fields belonging to a first, failed sub-channel using fields from a second, good channel, the fields from the second good channel adjacent to a field being recovered in a frame of the video sequence,
replace a reference field belonging to the failed sub-channel with the interpolated field within a reference frame cache, and
code a subsequently received reference field with reference to data of the interpolated field.

16. The video decoder of claim 15, wherein when a transmission error is detected, the video decoder interpolates field data of a lost field from a sub-channel for which a failure has occurred using data of a counterpart field from another sub-channel for which no failure has occurred, the fields from the another sub-channel adjacent to the lost field in a frame of the video sequence.

17. The video decoder of claim 16, wherein the decoder decodes other fields from the failed sub-channel that depend on the lost field using the interpolated field as a source of prediction.

* * * * *

UNITED STATES PATENT AND TRADEMARK OFFICE
CERTIFICATE OF CORRECTION

| | |
|---|---|
| PATENT NO. | : 8,964,838 B2 |
| APPLICATION NO. | : 13/175079 |
| DATED | : February 24, 2015 |
| INVENTOR(S) | : Dazhong Zhang et al. |

It is certified that error appears in the above-identified patent and that said Letters Patent is hereby corrected as shown below:

In the Claims

In Claim 5, Column 9, Line 20, please change:

"wherein, the coding engine is" to --wherein the coding engine is--;

In Claim 5, Column 9, Line 20, please change:

"further configured to" to --further configured to:--;

In Claim 15, Column 10, Line 36, please change:

"configured to" to --configured to:--.

Signed and Sealed this
Twenty-ninth Day of March, 2016

Michelle K. Lee
*Director of the United States Patent and Trademark Office*